United States Patent
Watanabe et al.

(10) Patent No.: US 12,405,680 B2
(45) Date of Patent: Sep. 2, 2025

(54) ACTIVE PEN

(71) Applicant: Wacom Co., Ltd., Saitama (JP)

(72) Inventors: Naoki Watanabe, Saitama (JP); Akiyuki Kake, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/545,926

(22) Filed: Dec. 19, 2023

(65) Prior Publication Data
US 2024/0118756 A1    Apr. 11, 2024

Related U.S. Application Data

(63) Continuation of application No. PCT/JP2021/026050, filed on Jul. 9, 2021.

(51) Int. Cl.
*G06F 3/0354* (2013.01)
*G06F 3/01* (2006.01)

(52) U.S. Cl.
CPC .......... *G06F 3/03545* (2013.01); *G06F 3/016* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 2012/0127088 A1* | 5/2012 | Pance .................. | G06F 3/04812 345/173 |
| 2015/0116236 A1* | 4/2015 | Kim ........................ | G06F 3/038 345/173 |
| 2016/0282970 A1* | 9/2016 | Evreinov .............. | G06F 3/0383 |
| 2018/0046272 A1 | 2/2018 | Hara et al. | |
| 2019/0094974 A1 | 3/2019 | Hayashi | |

FOREIGN PATENT DOCUMENTS

| | | |
|---|---|---|
| JP | 2002259044 A | 9/2002 |
| JP | 2006031410 A | 2/2006 |
| JP | 2009238081 A | 10/2009 |
| JP | 2019066960 A | 4/2019 |
| WO | WO 2013186846 A1 | 12/2013 |
| WO | WO 2016186191 A1 | 11/2016 |

OTHER PUBLICATIONS

International Search Report, mailed Aug. 31, 2021, for PCT Patent Application No. PCT/JP2021/026050. (2 pages).

* cited by examiner

*Primary Examiner* — Nan-Ying Yang
(74) *Attorney, Agent, or Firm* — Seed Intellectual Property Law Group LLP

(57) ABSTRACT

Provided is an active pen including a haptic element, a pressure sensor that, in operation, detects pressure applied to a pen tip, a pen tip electrode provided on the pen tip, a communication device that, in operation, performs wireless communication, and an integrated circuit that, in operation, transmits, from the pen tip electrode, a downlink signal including a pen pressure value indicating a magnitude of the pressure detected by the pressure sensor, in which the integrated circuit, in operation, starts vibrating the haptic element when the communication device receives a control signal that instructs starting of vibration of the haptic element, and stops the vibrating of the haptic element when the pen pressure value falls below a first predetermined value.

5 Claims, 3 Drawing Sheets

ACTIVE PEN

BACKGROUND

Technical Field

The present disclosure relates to an active pen, and particularly, to an active pen including a haptic element that provides sensory feedback to a user.

Description of the Related Art

There is known a technique in which an electronic apparatus, such as a tablet terminal, controls a haptic element included in an electronic pen, to reproduce the feel of writing on paper. Examples of this type of technique are disclosed in Japanese Patent Laid-Open No. 2019-066960, Japanese Patent Laid-Open No. 2009-238081, and Japanese Patent Laid-Open No. 2002-259044.

There is some time lag in the control when the electronic apparatus controls the haptic element in the electronic pen. Hence, the vibration of the haptic element does not stop immediately after the pen tip has been separated from the panel surface, and the user may feel uncomfortable.

BRIEF SUMMARY

Accordingly, embodiments of the present disclosure provide an active pen that is capable of promptly stopping the vibration of the haptic element after the pen tip has been separated from the panel surface.

A first aspect of the present disclosure provides an active pen including a haptic element, a pressure sensor that, in operation, detects pressure applied to a pen tip, a pen tip electrode provided on the pen tip, a communication device that, in operation, performs near field communication, and an integrated circuit that, in operation, transmits, from the pen tip electrode, a downlink signal including a pen pressure value indicating a magnitude of the pressure detected by the pressure sensor, in which the integrated circuit, in operation, starts vibrating the haptic element when the communication device receives a control signal that instructs starting of vibration of the haptic element, and stops the vibrating of the haptic element when the pen pressure value falls below a first predetermined value.

A second aspect of the present disclosure provides an active pen including a haptic element, a pressure sensor that, in operation, detects pressure applied to a pen tip, and integrated circuit that, in operation, starts vibrating the haptic element in response to a pen-down event, and stops the vibrating of the haptic element in response to a pen-up event, in which the integrated circuit, in operation, stops the vibrating of the haptic element when a pen pressure value indicating a magnitude of the pressure detected by the pressure sensor falls below a first predetermined value.

According to the present disclosure, the vibration of the haptic element can be stopped according to the pen pressure value in the active pen. Therefore, the vibration of the haptic element can be stopped promptly after the pen tip has been separated from the panel surface.

DETAILED DESCRIPTION

A preferred embodiment of the present disclosure will now be described in detail with reference to the attached drawings.

Figure 1:
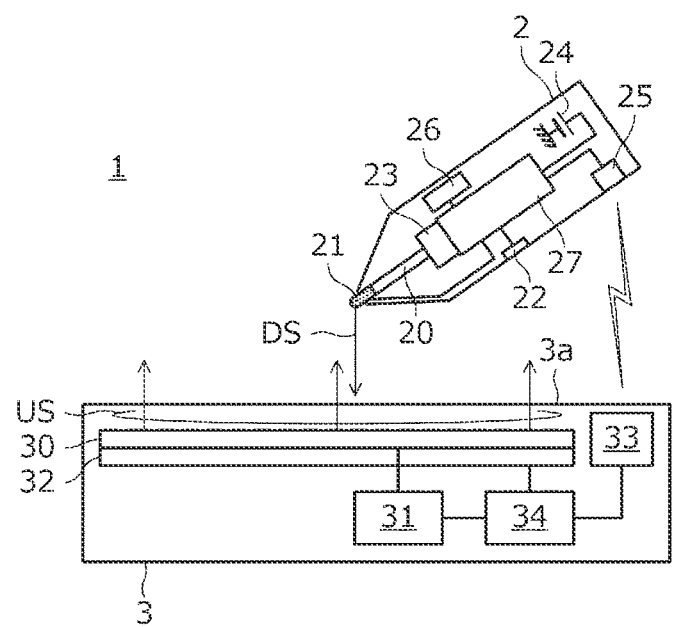
FIG. 1 depicts a configuration of a position detection system 1 according to an embodiment of the present disclosure.

FIG. 1 depicts a configuration of a position detection system 1 according to the preferred embodiment of the present disclosure. As illustrated in FIG. 1, the position detection system 1 includes an active pen 2 and an electronic apparatus 3 that is a position detection apparatus configured to detect the active pen 2.

The electronic apparatus 3 is a computer, such as a tablet computer and a digitizer, including a panel surface 3a. A sensor 30 arranged in the panel surface 3a, a sensor controller 31 connected to the sensor 30, a display 32 placed in an overlapping relation with the sensor 30, a wireless communication device 33, and a host processor 34 that controls the components of the electronic apparatus 3 including them are provided in the electronic apparatus 3.

The host processor 34 is a central processing unit of the electronic apparatus 3, and is configured to read various programs from an unillustrated memory and execute the programs. The programs executed in this way include various applications including an operating system of the electronic apparatus 3 and a drawing application. Of these applications, the drawing application is a program for executing a process of generating digital ink in reference to the position and the data supplied from the sensor controller 31 and storing the digital ink in the memory of the electronic apparatus 3 and a process of rendering the generated digital ink to generate a video signal indicating the result and supplying the video signal to the display 32. The display 32 is a device that displays the video signal supplied from the host processor 34, and includes, for example, a liquid crystal display or an organic electroluminescence (EL) display.

The sensor 30 is a device in which a plurality of sensor electrodes are arranged in the panel surface 3a. Some of the plurality of sensor electrodes included in the sensor 30 can also be used as common electrodes of the display 32 (electrodes for supplying in common the ground potential to the pixels). When the sensor electrodes are also used as common electrodes, the electronic apparatus 3 provides what is generally called an "in-cell" position detection apparatus. On the other hand, when the sensor electrodes are not used as common electrodes, the electronic apparatus 3 provides what is generally called an "on-cell" or "out-cell" position detection apparatus. The present disclosure can suitably be applied to any of the electronic apparatuses 3.

The sensor controller 31 is an integrated circuit with a function of detecting the position of the active pen 2 in the panel surface 3a. Although an active electrostatic system (AES) is used to execute the detection in the example described in the present embodiment, the present disclosure can also suitably be applied when another system, such as an electromagnetic resonance system (EMR), is used to detect the position of the active pen 2.

The sensor controller 31 corresponding to the AES is configured to perform two-way communication with the active pen 2 through capacitive coupling between the sensor 30 and an electrode (pen tip electrode 21 described later) in the active pen 2. Hereinafter, a signal transmitted from the sensor controller 31 to the active pen 2 through the communication will be referred to as an "uplink signal US," and a signal transmitted from the active pen 2 to the sensor controller 31 will be referred to as a "downlink signal DS."

The uplink signal US is a signal periodically transmitted by the sensor controller 31. The uplink signal US plays a role of notifying the active pen 2 of the transmission timing of the downlink signal DS and the reception timing of the next uplink signal US and plays a role of transmitting a command to the active pen 2. On the other hand, the downlink signal DS is a signal including a position signal, which is an unmodulated carrier signal, and a data signal, which is a carrier signal modulated by data. The position signal is a signal for causing the sensor controller 31 to detect the position of the active pen 2, and the sensor controller 31 is configured to derive the position of the active pen 2 in the panel surface 3a in reference to the distribution of the reception strength of the position signal in each sensor electrode of the sensor 30. The data transmitted by the data signal includes switch information and a pen pressure value described later, as well as data for which transmission is instructed by a command. The sensor controller 31 demodulates the data signal to acquire the data transmitted by the active pen 2. The position derived by the sensor controller 31 and the data acquired by the sensor controller 31 in this way are sequentially supplied from the sensor controller 31 to the host processor 34.

The wireless communication device 33 is a communication device for performing wireless, near field communication as exemplified by Bluetooth (registered trademark), and is connected to the host processor 34. The host processor 34 performs near field communication with the active pen 2 and other devices (such as a keyboard, a mouse, a speaker, and headphones) through the wireless communication device 33.

The signal transmitted by the host processor 34 to the active pen 2 through the wireless communication device 33 includes a control signal of a haptic element 26 described later. The host processor 34 is configured to a detect pen-down event and transmit a control signal that instructs the haptic element 26 to start vibrating, when the pen pressure value supplied from the sensor controller 31 exceeds a predetermined value V2 (typically, V2=0). On the other hand, the host processor 34 is configured to detect a pen-up event and transmit a control signal that instructs the haptic element 26 to stop vibrating, when the pen pressure value supplied from the sensor controller 31 reaches the predetermined value V2. This will be described in more detail later with reference to FIG. 2.

The active pen 2 is an electronic pen (stylus) corresponding to the AES, and includes a core body 20, the pen tip electrode 21, a side switch 22, a pressure sensor 23, a battery 24, a wireless communication device 25, the haptic element 26, and an integrated circuit 27 as illustrated in FIG. 1. The core body 20 is a member that configures a pen axis of the active pen 2. The front end of the core body 20 configures the pen tip of the active pen 2, and the back end is abutted to the pressure sensor 23. The pen tip electrode 21 is a conductor arranged on the pen tip, and is electrically connected to the integrated circuit 27. Note that a plurality of pen tip electrodes 21 may be provided in the active pen 2, and, for example, different pen tip electrodes 21 may be used for transmission and reception.

The side switch 22 is a press-button switch provided on the surface of the active pen 2, and the user can turn on and off the side switch 22. The operation state (on-off state) of the side switch 22 is supplied as, for example, switch information of 2 bits to the integrated circuit 27. The pressure sensor 23 is a sensor that detects the pressure applied to the front end (pen tip) of the core body 20. The pressure detected by the pressure sensor 23 is supplied as, for example, a pen pressure value of 12 bits to the integrated circuit 27. The battery 24 plays a role of supplying power necessary for the integrated circuit 27 to operate.

The wireless communication device 25 is a communication device for performing wireless, near field communication as exemplified by Bluetooth (registered trademark). The integrated circuit 27 performs near field communication with the host processor 34 of the electronic apparatus 3 through the wireless communication device 25. The signal received by the integrated circuit 27 from the host processor 34 through the near field communication includes a control signal of the haptic element 26.

The haptic element 26 is a device that provides sensory feedback to the user of the active pen 2, and, for example, includes a vibrator of an eccentric rotating mass system, a linear resonant actuator system, or a piezo (piezoelectric) actuator system. A magnetic fluid in which the hardness can be controlled by the frequency of the applied pulse current may be used to provide the haptic element 26. The following description is based on the assumption that the haptic element 26 includes the vibrator of the eccentric rotating mass system. In this case, the haptic element 26 includes a motor and an eccentric weight attached to the axis of rotation of the motor.

The integrated circuit 27 is a circuit that executes various processes for communicating with the sensor controller 31 through the pen tip electrode 21 and communicating with the host processor 34 through the wireless communication device 25. Specifically, the integrated circuit 27 executes a process of detecting a change in the potential of the pen tip electrode 21 to receive the uplink signal US, a process of using the reception timing of the uplink signal US as reference time to determine a transmission and reception schedule of the downlink signal DS and the next uplink signal US, a process of generating the downlink signal DS according to the command included in the uplink signal US, and a process of changing the potential of the pen tip electrode 21 according to the determined transmission and reception schedule to transmit the generated downlink signal DS. The integrated circuit 27 also pairs with the host processor 34 through the wireless communication device 25, receives various control signals from the paired host processor 34, and executes processes based on the received control signals.

The processes based on the received control signals include a process of starting or stopping the vibration of the haptic element 26. Specifically, the integrated circuit 27 is configured to start or stop the vibration of the haptic element 26 according to the control signal transmitted by the host processor 34. Here, the integrated circuit 27 also executes the process of stopping the vibration of the haptic element 26 when the pen pressure value supplied from the pressure sensor 23 reaches a value equal to or smaller than a predetermined value V1. The predetermined value V1 is a value (V1>V2) larger than the predetermined value V2 (value used by the host processor 34 to detect pen-down and pen-up). In the actual process, the integrated circuit 27 stops the vibration of the haptic element 26 at the timing that the wireless communication device 25 receives the control signal that instructs the haptic element 26 to stop vibrating or at the timing that the pen pressure value supplied from the pressure sensor 23 falls below the predetermined value V1, whichever comes first.

Figure 2:
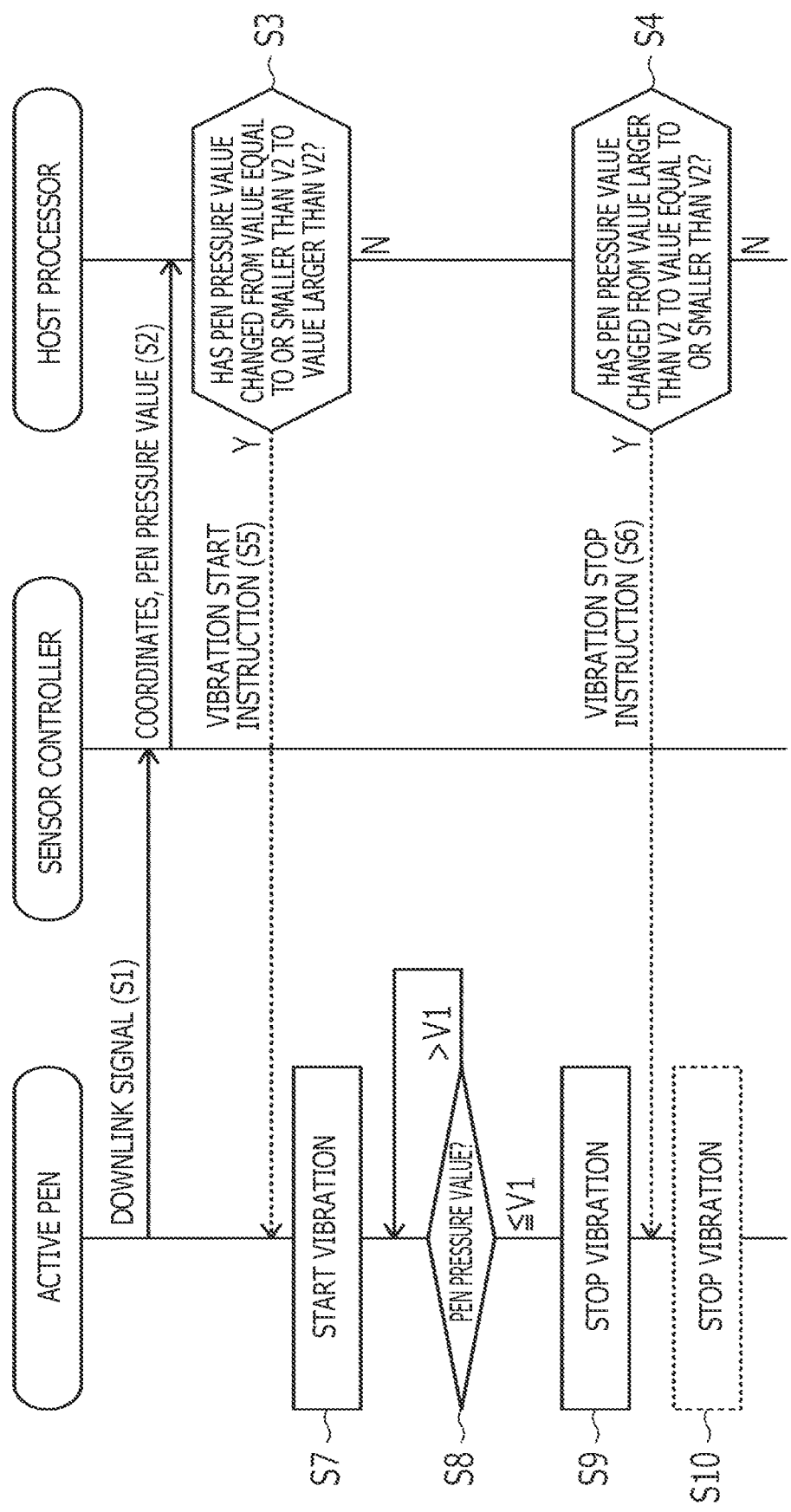
FIG. 2 depicts a sequence of a process executed in the position detection system 1 according to the embodiment of the present disclosure.

FIG. 2 depicts a sequence of the process executed in the position detection system 1. Only the process related to the control of the haptic element 26 is extracted and illustrated in FIG. 2. The process executed by the active pen 2, the sensor controller 31, and the host processor 34 in relation to the control of the haptic element 26 will be described below with reference to FIG. 2.

First, as illustrated in FIG. 2, once the active pen 2 transmits the downlink signal DS (S1), the sensor controller 31 derives the coordinates indicating the position of the active pen 2 in the panel surface 3a in reference to the position signal in the downlink signal DS, acquires the pen pressure value and other data from the data signal in the downlink signal DS, and supplies the data to the host processor 34 (S2). The process of S1 and S2 is executed every time the active pen 2 transmits the downlink signal DS.

Next, every time the pen pressure value is supplied from the sensor controller 31, the host processor 34 determines whether or not there is occurrence of pen-down or pen-up in reference to the series of pen pressure values supplied so far (S3 and S4) and uses the near field communication to transmit the control signal of the haptic element 26 according to the result of the determination (S5 and S6). Specifically, the host processor 34 detects occurrence of pen-down when the pen pressure value changes from a value equal to or smaller than the predetermined value V2 (typically, V2=0) to a value larger than the predetermined value V2 (S3) and transmits a control signal that instructs the haptic element 26 to start vibrating (S5). Further, the host processor 34 detects occurrence of pen-up when the pen pressure value changes from a value larger than the predetermined value V2 to a value equal to or smaller than the predetermined value V2 (S4) and transmits a control signal that instructs the haptic element 26 to stop vibrating (S6).

After receiving the control signal that instructs the haptic element 26 to start vibrating, the integrated circuit 27 of the active pen 2 starts vibrating the haptic element 26 (S7). Specifically, the integrated circuit 27 applies a current in a first direction to the motor included in the haptic element 26, to start vibrating the haptic element 26. As a result, when the user slides the active pen 2 on the panel surface 3a, the user can feel vibration similar to the vibration in sliding a real writing tool, such as a ballpoint pen, on paper.

While vibrating the haptic element 26, the integrated circuit 27 executes a process of comparing the supplied pen pressure value and the predetermined value V1 every time the pen pressure value is supplied from the pressure sensor 23 (S8). The integrated circuit 27 stops vibrating the haptic element 26 when detecting that the pen pressure value has become a value equal to or smaller than the predetermined value V1 as a result of the comparison (S9). The integrated circuit 27 also stops vibrating the haptic element 26 when receiving the control signal that instructs the haptic element 26 to stop vibrating (S10). Only one of S9 and S10 that is executed earlier is actually executed.

Here, in stopping the vibration of the haptic element 26 at S9 or S10, it is preferable that the integrated circuit 27 apply a current in a direction opposite the first direction to the motor and then stop applying the current to the motor to stop the vibration of the haptic element 26. This can stop the residual vibration of the haptic element 26 caused by inertia more promptly than in a case in which the application of the current to the motor is stopped without the current being applied in the direction opposite the first direction to the motor.

As described above, according to the position detection system 1 of the present embodiment, the vibration of the haptic element 26 can be stopped according to the pen pressure value in the active pen 2. This can stop the vibration of the haptic element 26 promptly after the pen tip has been separated from the panel surface 3a.

Further, according to the active pen 2 of the present embodiment, the vibration of the haptic element 26 is stopped when the pen pressure value falls below the predetermined value V1 that is larger than the predetermined value V2 generally used for the determination of pen-down and pen-up. Hence, even if there is residual vibration of the haptic element 26 caused by inertia, the vibration of the haptic element 26 can be stopped immediately after the pen tip has been separated from the panel surface 3a.

Note that the present disclosure can also suitably be applied when the predetermined value V1 is equal to the predetermined value V2. In this case, the residual vibration of the haptic element 26 caused by inertia may remain after the pen tip has been separated from the panel surface 3a. However, the vibration of the haptic element 26 can be stopped more promptly than in the control from the electronic apparatus 3.

Further, according to the active pen 2 of the present embodiment, the current in the direction opposite the previous direction is applied to the motor in stopping the vibration of the haptic element 26. This can promptly stop the residual vibration of the haptic element 26 caused by inertia.

Although the preferred embodiment of the present disclosure has been described, the present disclosure is not limited to the embodiment in any way, and it is obvious that the present disclosure can be carried out in various modes without departing from the scope of the present disclosure.

Figure 3:
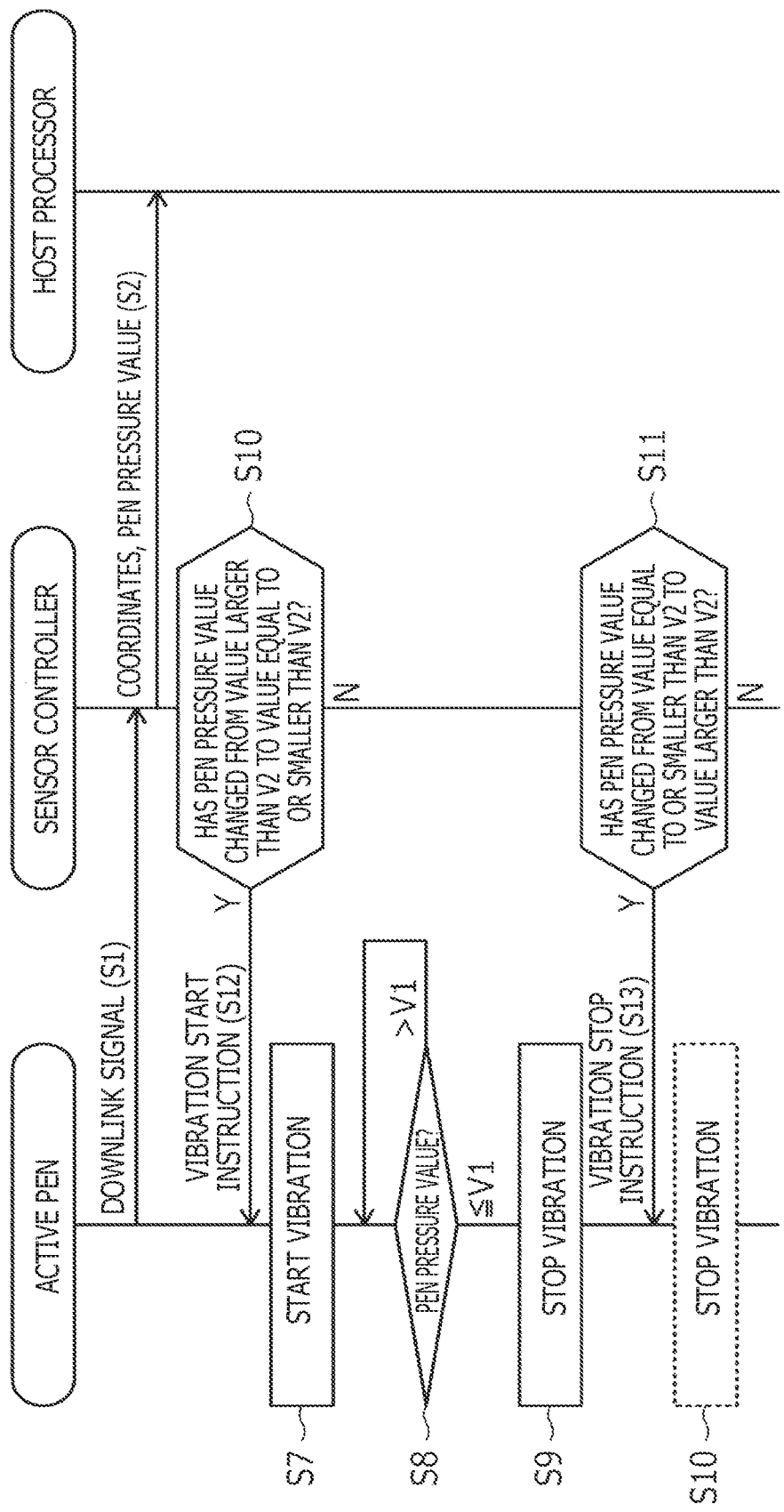
FIG. 3 depicts a sequence of a process executed in the position detection system 1 according to a modification of the present embodiment.

FIG. 3 depicts a sequence of the process executed in the position detection system 1 according to a modification of the present embodiment. The present modification is different from the present embodiment in that the process of S10 to S13 is executed in place of S3 to S6 illustrated in FIG. 2.

More specifically, the sensor controller 31 in the present modification determines whether or not there is occurrence of pen-down or pen-up in reference to the series of pen pressure values acquired so far (S10 and S11) and uses the uplink signal US to transmit the control signal of the haptic element 26 according to the result of the determination (S12 and S13). The specific process of S10 to S13 is similar to that of S3 to S6 except that the uplink signal US is used instead of the near field communication.

In this way, according to the present disclosure, the vibration of the haptic element 26 can also be stopped according to the pen pressure value in the active pen 2 even when the sensor controller 31 uses the uplink signal US to transmit the control signal of the haptic element 26. This can stop the vibration of the haptic element 26 promptly after the pen tip has been separated from the panel surface 3a.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An active pen, comprising:
   a haptic element;
   a pressure sensor that, in operation, detects pressure applied to a pen tip;
   a pen tip electrode provided on the pen tip;
   a communication device that, in operation, performs wireless communications; and
   an integrated circuit that, in operation, transmits, from the pen tip electrode, a downlink signal including a pen pressure value indicating a magnitude of the pressure detected by the pressure sensor,
   wherein the integrated circuit, in operation,
      starts vibrating the haptic element when the communication device receives, from a device external to the active pen, a control signal that instructs starting of vibration of the haptic element, and
      stops the vibrating of the haptic element when the pen pressure value falls below a first predetermined value independently from a status of the control signal,
   wherein the haptic element includes a motor, and
   wherein the integrated circuit, in operation,
      applies a first current in a first direction to the motor to start the vibrating of the haptic element, and
      applies a second current in a direction opposite the first direction to the motor and then stops applying the second current to the motor to stop the vibrating of the haptic element when the pen pressure value falls below the first predetermined value.

2. The active pen according to claim 1, wherein:
   the device external to the active pen is a host processor connected to a sensor controller that, in operation, receives the downlink signal through capacitive coupling between a sensor arranged in a panel surface and the pen tip electrode, and
   the host processor, in operation, wirelessly transmits the control signal that instructs starting of the vibration of the haptic element when the pen pressure value supplied from the sensor controller exceeds a second predetermined value.

3. An active pen, comprising:
   a haptic element;
   a pressure sensor that, in operation, detects pressure applied to a pen tip;
   a pen tip electrode provided on the pen tip;
   a communication device that, in operation, performs wireless communications; and
   an integrated circuit that, in operation, transmits, from the pen tip electrode, a downlink signal including a pen pressure value indicating a magnitude of the pressure detected by the pressure sensor,
   wherein the integrated circuit, in operation,
      starts vibrating the haptic element when the communication device receives, from a device external to the active pen, a control signal that instructs starting of vibration of the haptic element, and
      stops the vibrating of the haptic element when the pen pressure value falls below a first predetermined value independently from a status of the control signal,
   wherein the device external to the active pen is a host processor connected to a sensor controller that, in operation, receives the downlink signal through capacitive coupling between a sensor arranged in a panel surface and the pen tip electrode, and
   wherein the host processor, in operation, wirelessly transmits the control signal that instructs starting of the vibration of the haptic element when the pen pressure value supplied from the sensor controller exceeds a second predetermined value, and
   wherein the first predetermined value is larger than the second predetermined value.

4. The active pen according to claim 2, wherein:
   the host processor, in operation, wirelessly transmits a control signal that instructs stopping of the vibration of the haptic element when the pen pressure value supplied from the sensor controller falls below the first predetermined value.

5. An active pen comprising:
   a haptic element;
   a pressure sensor that, in operation, detects pressure applied to a pen tip; and
   an integrated circuit that, in operation, starts vibrating the haptic element in response to receiving, from a device external to the active pen, a control signal that instructs starting of vibration of the haptic element,
   wherein the integrated circuit, in operation, stops the vibrating of the haptic element when a pen pressure value indicating a magnitude of the pressure detected by the pressure sensor falls below a first predetermined value independently from a status of the control signal;
   a pen tip electrode provided on the pen tip; and
   a communication device that, in operation, performs wireless communication,
   wherein:
      the integrated circuit, in operation, transmits, from the pen tip electrode, a downlink signal including the pen pressure value indicating the magnitude of the pressure detected by the pressure sensor,
      the device external to the active pen is a host processor connected to a sensor controller that, in operation, receives the downlink signal through capacitive coupling between a sensor arranged in a panel surface and the pen tip electrode, and
      the host processor, in operation,
         detects a pen-down event when the pen pressure value supplied from the sensor controller exceeds a second predetermined value, and
         wirelessly transmits the control signal that instructs the starting of the vibration of the haptic element to thereby start the vibrating of the haptic element when the pen-down event is detected, and
      the first predetermined value is larger than the second predetermined value.

* * * * *